United States Patent [19]

Brissenden et al.

[11] Patent Number: 5,634,863
[45] Date of Patent: Jun. 3, 1997

[54] DROP BOX WITH ANGLED INPUT SHAFT

[75] Inventors: James S. Brissenden, Baldwinsville; John D. Zalewski, Liverpool, both of N.Y.

[73] Assignee: New Venture Gear, Inc., Troy, Mich.

[21] Appl. No.: 516,440

[22] Filed: Aug. 17, 1995

[51] Int. Cl.$^6$ .................................................. F16H 37/06
[52] U.S. Cl. .................... 474/148; 74/665 C; 74/665 H; 74/665 T
[58] Field of Search .............................. 424/148; 180/233, 180/235, 236; 74/665 C, 665 H, 665 T

[56] References Cited

U.S. PATENT DOCUMENTS

| | | | |
|---|---|---|---|
| 3,631,615 | 1/1972 | Dunlap | 180/9.1 X |
| 4,042,053 | 8/1977 | Sieren et al. | 180/236 |
| 4,165,793 | 8/1979 | Marsch et al. | 180/233 |
| 4,632,207 | 12/1986 | Moore | 74/665 GE X |
| 4,688,447 | 8/1987 | Dick | 74/665 T |
| 4,798,103 | 1/1989 | Eastman et al. | 475/142 |
| 5,116,293 | 5/1992 | Reuter | 475/202 |

*Primary Examiner*—Roger J. Schoeppel
*Attorney, Agent, or Firm*—Harness, Dickey & Pierce, P.L.C.

[57] ABSTRACT

A power transfer system is disclosed having a drop box for connecting a motor vehicle's drivetrain to an offset driveline. The drop box has an input that is angled relative to its output by means of a constant velocity (CV) universal joint. More specifically, a first rotary member is coupled for driven rotation about the rotary axis of the transmission output shaft while a second rotary member is supported for rotation about a second rotary axis that is angled relative to the first rotary axis. A CV joint drivingly interconnects the second rotary member to the first rotary member. The drop box also includes a third rotary member adapted for connection to the driveline and which is supported for rotation about a third rotary axis that is offset from the second rotary axis. A drive connection interconnects the third rotary member to the second rotary member. The CV joint allows the drop box to be angulated so that a reduced departure angle is achieved with respect to the prop shaft connection.

1 Claim, 5 Drawing Sheets

DROP BOX WITH ANGLED INPUT SHAFT

BACKGROUND OF THE INVENTION

The present invention relates to a power transfer system for motor vehicles and, in particular, to a drop box having means for establishing an angular driving connection between its input and the output of a multi-speed transmission.

In view of the increased popularity of sport utility vehicles, a plethora of power transfer systems are currently utilized for delivering tractive power (i.e., drive torque) to the driven wheels of the motor vehicle. Conventionally, most two-wheel drive power transfer systems for rear wheel drive vehicles include a rear prop shaft which connects the output shaft of the transmission to the rear axle assembly for driving the rear wheels.

However, a problem commonly associated with this type of power transfer system is that the rear prop shaft, due to its central alignment, takes up a substantial amount of the vehicle's underbody space which inhibits placement of an underbody spare tire and/or necessitates usage of a saddle-type gas tank. To alleviate this problem, it is known to install a transfer device, commonly referred to in the industry as a "drop box", between the transmission output shaft and the rear prop shaft. Typically, the drop box has an input shaft coupled to the transmission output shaft, an output shaft laterally offset from the input shaft, and a drive connection (i.e., layshaft, chain drive, etc.) interconnecting the output shaft for driven rotation with the input shaft. Accordingly, utilization of a drop box provides increased underbody space for purposes of locating a spare tire and/or installing a larger fuel tank.

A design consideration associated with vehicles equipped with a drop box is to minimize the departure angle at the rotary connection between the drop box output shaft and the prop shaft. The departure angle is defined as the included angle between the rotary axis of the prop shaft and the rotary axis of the drop box output shaft. Traditionally, single cardan universal joints are used at each end of the prop shaft if the departure angle is less than about five degrees. If the departure angle exceed this threshold limit, then more expensive double cardan universal joints are typically required at the prop shaft/drop box connection. In an attempt to solve problems similar to those associated with large departure angles for drop boxes, U.S. Pat. Nos. 4,632,207 to Moore and 5,116,293 to Reuter disclose the use of a constant velocity (CV) joint at the offset front output of a four-wheel drive transfer case. An alternative arrangement is likewise shown in U.S. Pat. No. 4,688,447 to Dick. However, in each instance, the rear output of the transfer case is commonly aligned with the rotary axis of the transfer case input.

SUMMARY OF THE INVENTION

Accordingly, the present invention is directed to overcoming the disadvantages associated with conventional two-wheel drive systems for rear-wheel drive vehicles by providing a power transfer system including a drop box equipped with a constant velocity (CV) universal joint between its input and the transmission output. In general, the drop box input includes a first rotary member adapted to be coupled to the transmission output shaft for common rotation about a first rotary axis, a second rotary member supported for rotation about a second rotary axis that is angled relative to the first rotary axis, and a CV joint interconnecting the first and second rotary members. The drop box output includes a third rotary member adapted for connection to the prop shaft and which is supported for rotation about a third rotary axis that is offset from the second rotary axis. A drive connection interconnects the third rotary member to the second rotary member. As such, the CV joint allows the drop box to be angulated so that a reduced departure angle is achieved with respect to the drop box output/prop shaft connection.

BRIEF DESCRIPTION OF THE DRAWINGS

Further objects, features, and advantages of the present invention will become apparent from analysis of the following written specification, the accompanying drawings, and the appended claims in which:

DETAILED DESCRIPTION OF THE PREFERRED EMBODIMENTS

Figure 1:
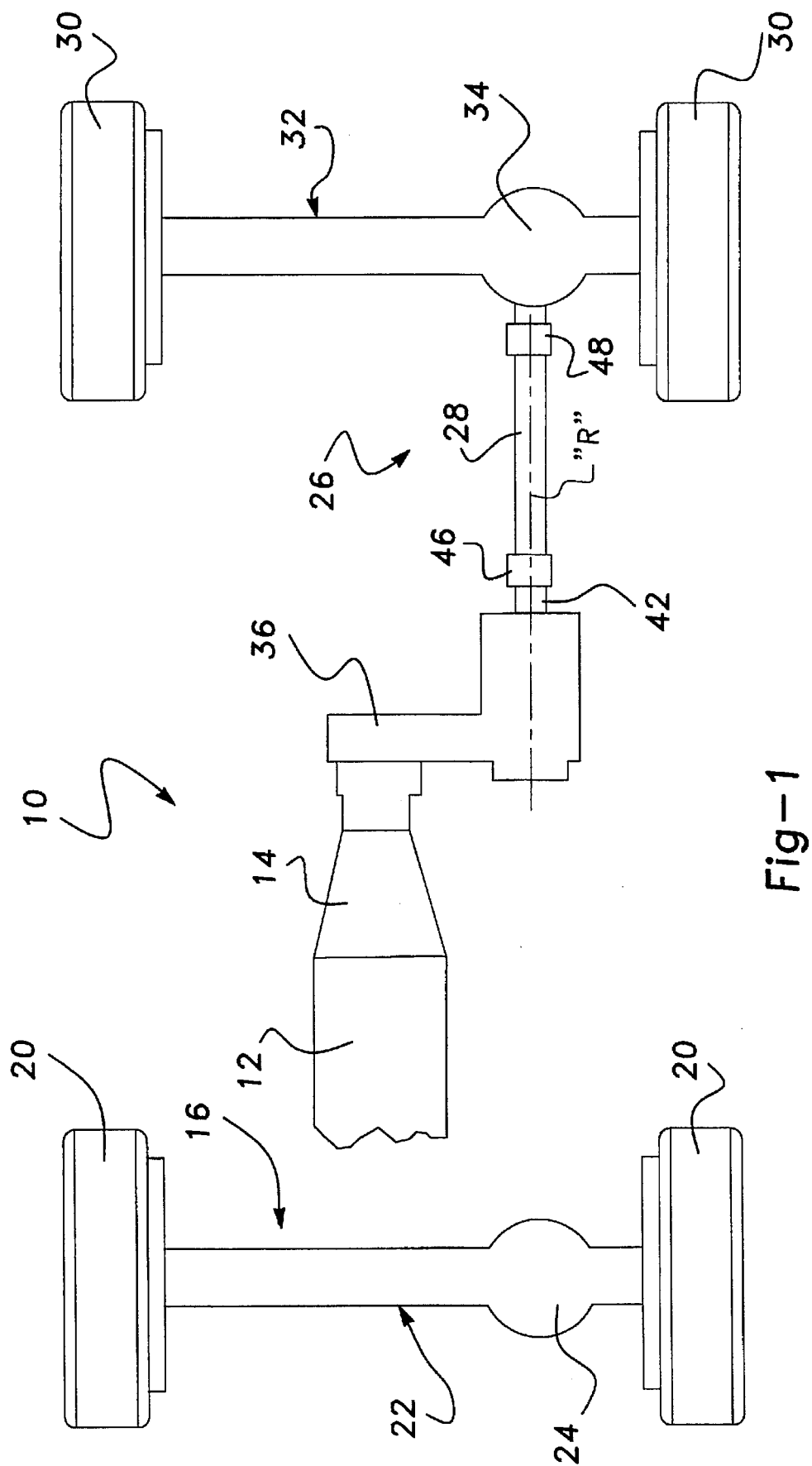
FIG. 1 is a top plan view of a two-wheel drive power transfer system for a rear-wheel drive motor vehicle utilizing the drop box of the present invention for connecting the vehicle's drivetrain to the rear driveline.

In general, the present invention is directed to a power transfer device for interconnecting the drivetrain of a motor vehicle to its driveline. The power transfer device is a drop box equipped with a constant velocity (CV) type universal joint for angling its input relative to its output so as to reduce the departure angle of the driveline relative thereto. The reduced driveline angle facilitates the use of a less expensive single cardan joint at the drop box output in substitution for the traditional, more expensive, double cardan variety. The following written disclosure, when taken in conjunction with the drawings and claims, is intended to describe the best mode known to the inventors for making the inventive concepts claimed.

Referring to the drawings, a power transfer system for a rear wheel drive motor vehicle is shown which incorporates the novel principles and features of the present invention. The vehicle includes a drivetrain 10 defined schematically by an engine 12 and a transmission 14. The vehicle also includes a front driveline 16 defined by a pair of front wheels 20 interconnected to a front axle assembly 22 that is equipped with a front differential 24. A rear driveline 26 is defined by a rear prop shaft 28 that is interconnected to a pair of rear wheels 30 via a rear axle assembly 32 having a rear differential 34. Rear prop shaft 28 is adapted to rotate about an axis, denoted by reference letter "R". Drivetrain 10 is coupled to rear driveline 26 via a drop box 36. Drop box 36 has an input 38 that is adapted for connection to an output 40 of transmission 14, an output 42 adapted for connection to rear driveline 26, and a drive connection 44 interconnecting output 42 to input 38. Output 42 is connected to a forward end of rear prop shaft 28 via a single cardan universal joint 46 while the rearward end of rear prop shaft 28 is connected to rear differential 34 by means of a single cardan universal joint 48.

Figure 3:
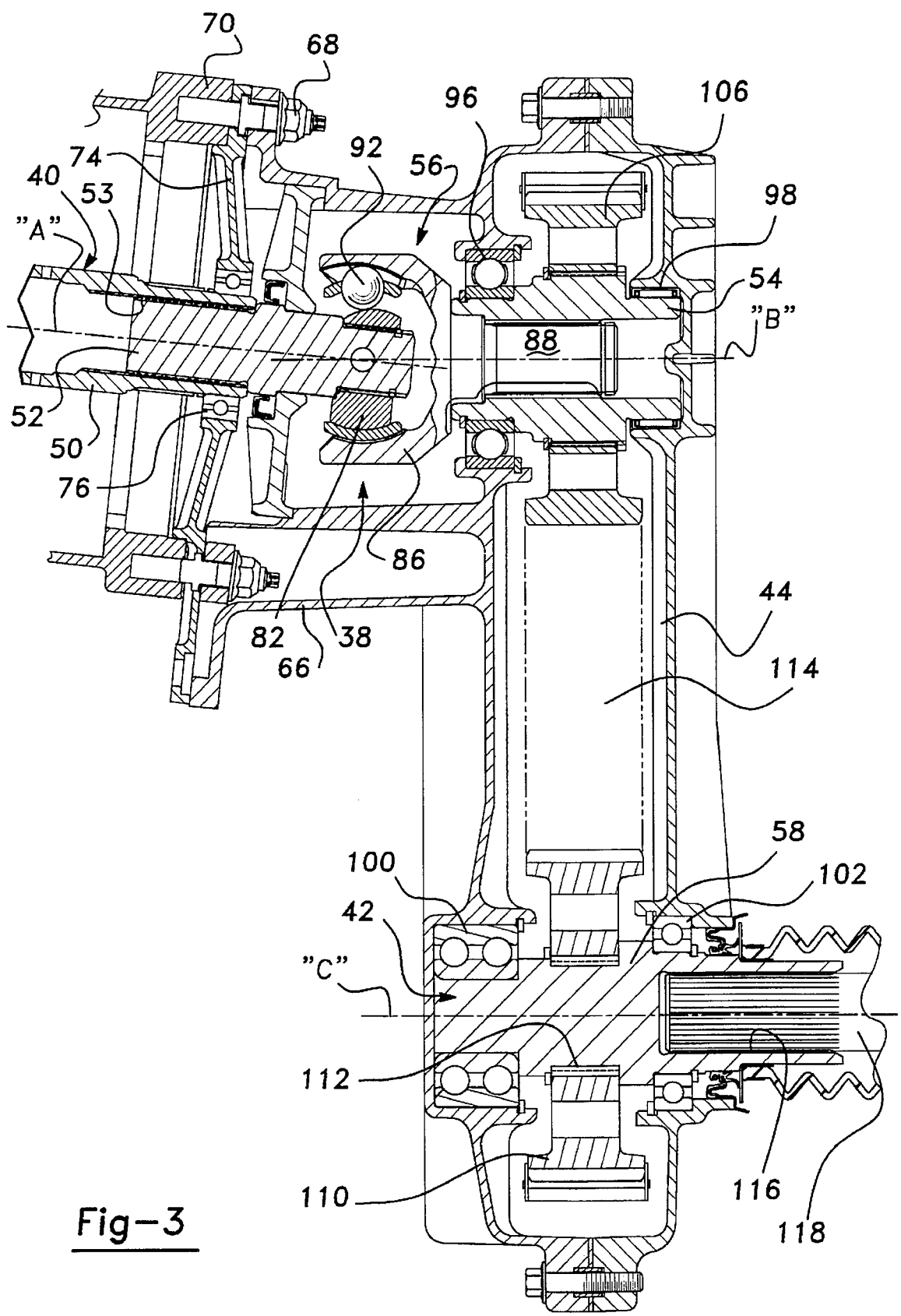
FIG. 3 is a sectional view of the drop box of the present invention.

As best seen from FIG. 3, output 40 of transmission 14 is shown to include an output shaft 50. Input 38 of drop box 36 includes a first rotary member, referred to as input shaft 52, that is angularly interconnected to a second rotary member, referred to as drive shaft 54, via a constant velocity (CV) universal joint 56. As seen, input shaft 52 is connected via a splined connection 53 to output shaft 50 and is supported for common rotation therewith about a first axis of rotation, denoted by reference letter "A". Moreover, drive shaft 54 is supported within drop box 36 for rotation about a second axis of rotation, denoted by reference letter "B". Output 42 of drop box 36 includes a third rotary member, referred to as output shaft 58, that is supported for rotation about a third axis of rotation, denoted by reference letter "C".

Figure 2:
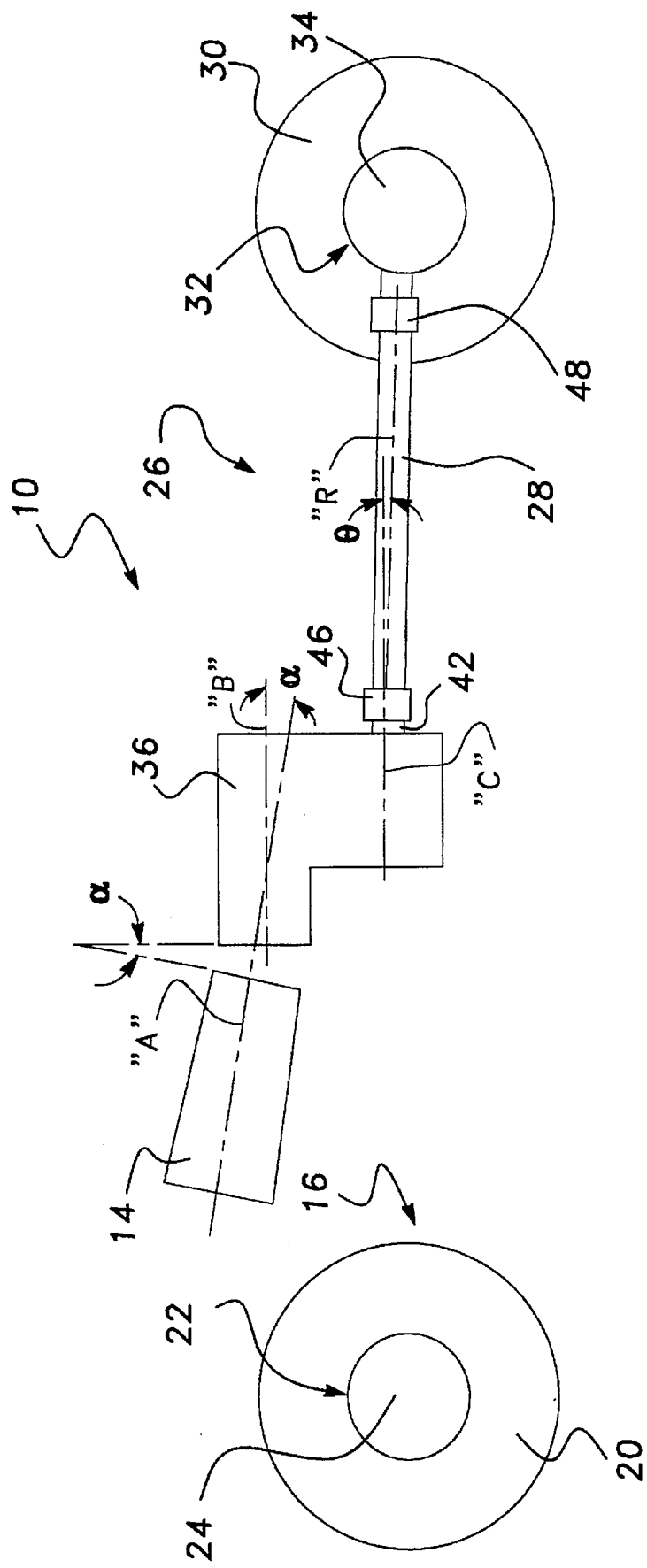
FIG. 2 is a side view of FIG. 1, illustrating the angular relationship between the input of the drop box and the output of the drivetrain as well as the angular relationship between the rear driveline and the drop box output.

Rotary axis "A" of transmission output shaft 50 and drop box input shaft 52 is vertically coplanar with rotary axis "B" of drive shaft 54. Preferably, rear axis "R" is vertically coplanar with rotary axis "C" of drop box output shaft 58. From FIGS. 2 and 3, it is shown that the rotary axis "B" of drive shaft 54 intersects the rotary axis "A" of input shaft 52 at an input angle, denoted by ($\alpha$). This angular relationship, permitted via CV joint 56, essentially tips drop box 36 such that the departure angle, denoted by ($\theta$), between rotary axis "R" of rear prop shaft 28 and rotary axis "C" of output shaft 58 can be substantially reduced. According to one driveline application now contemplated, an input angle ($\alpha$) of about five degrees results in a departure angle ($\theta$) of less than two degrees. As noted, such a reduced departure angle facilitates the use of less costly universal joints and provides a significant advantage over prior art systems. Obviously, the particular input and departure angle selected will depend on each specific driveline application.

Figure 4:
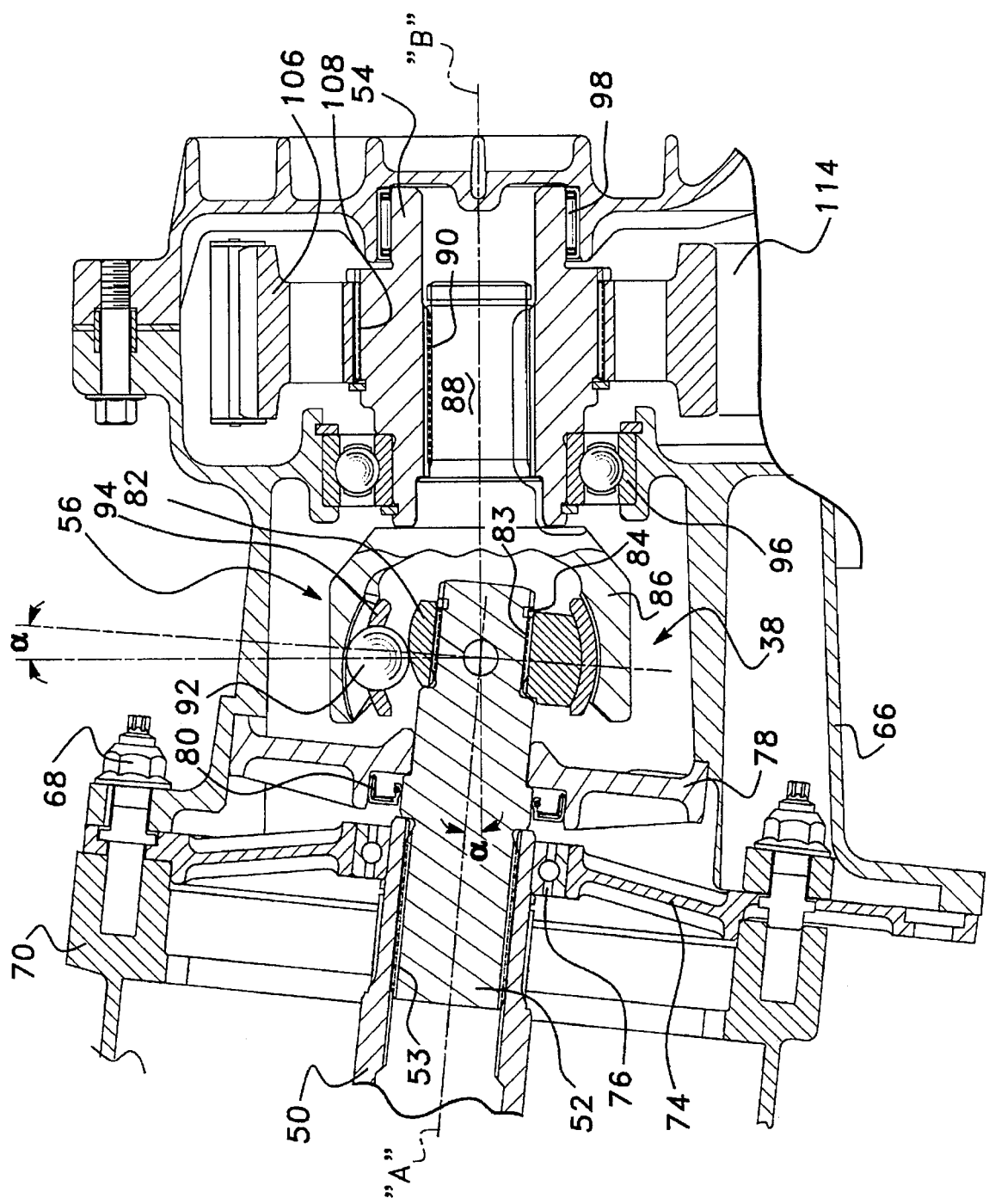
FIG. 4 is an enlarged partial view of FIG. 3 showing the integration of a CV joint into the input section of the drop box in greater detail.

With particular attention now drawn to FIGS. 3 and 4, the various components of drop box 36 will now be described with greater specificity. Drop box 36 includes a housing 66 that is secured via bolts 68 to transmission housing 70. As noted, a splined connection 53 couples transmission output shaft 50 to one end of input shaft 52. Transmission output shaft 50 is shown supported in housing 66 via an apertured cover plate 74 and a suitable bearing assembly 76. Likewise, input shaft 52 is shown supported for rotation in housing 66 via an apertured support plate 78 and a suitable seal 80. An inner race 82 of a Rzeppa-type CV joint 56 is fixed via a splined connection 83 to the stepped opposite end of input shaft 52 and retained thereon via a retaining ring 84. An outer race 86 surrounds inner race 82 and has an integral stub shaft 88 that is coupled via a splined connection 90 to drive shaft 54. A plurality of balls 92, entrapped by a cage 94, are disposed between and in contact with inner race 82 and outer race 86. It is contemplated that any suitable type and size of CV joint can be used for providing the angular connection at input 38 of drop box 36.

Drive shaft 54 is supported from housing 66 by a pair of axially-spaced bearing assemblies 96 and 98 for rotation about the "B" rotary axis. Likewise, output shaft 58 is supported from housing 66 for rotation about the "C" rotary axis by a pair of axially-spaced bearing assemblies 100 and 102. Drive connection 44 includes a drive sprocket 106 fixed via a splined connection 108 to the outer periphery of drive shaft 54 for common rotation therewith. Drive connection 44 also includes a driven sprocket 110 that is fixed via a splined connection 112 for common rotation with output shaft 58. A drive chain 114, shown in phantom, interconnects driven sprocket 110 to drive sprocket 106. The portion of output shaft 58 which extends beyond housing 66 includes an internally-splined bore 116 adapted to receive the externally-splined yoke 118 of universal joint 46.

Figure 5:
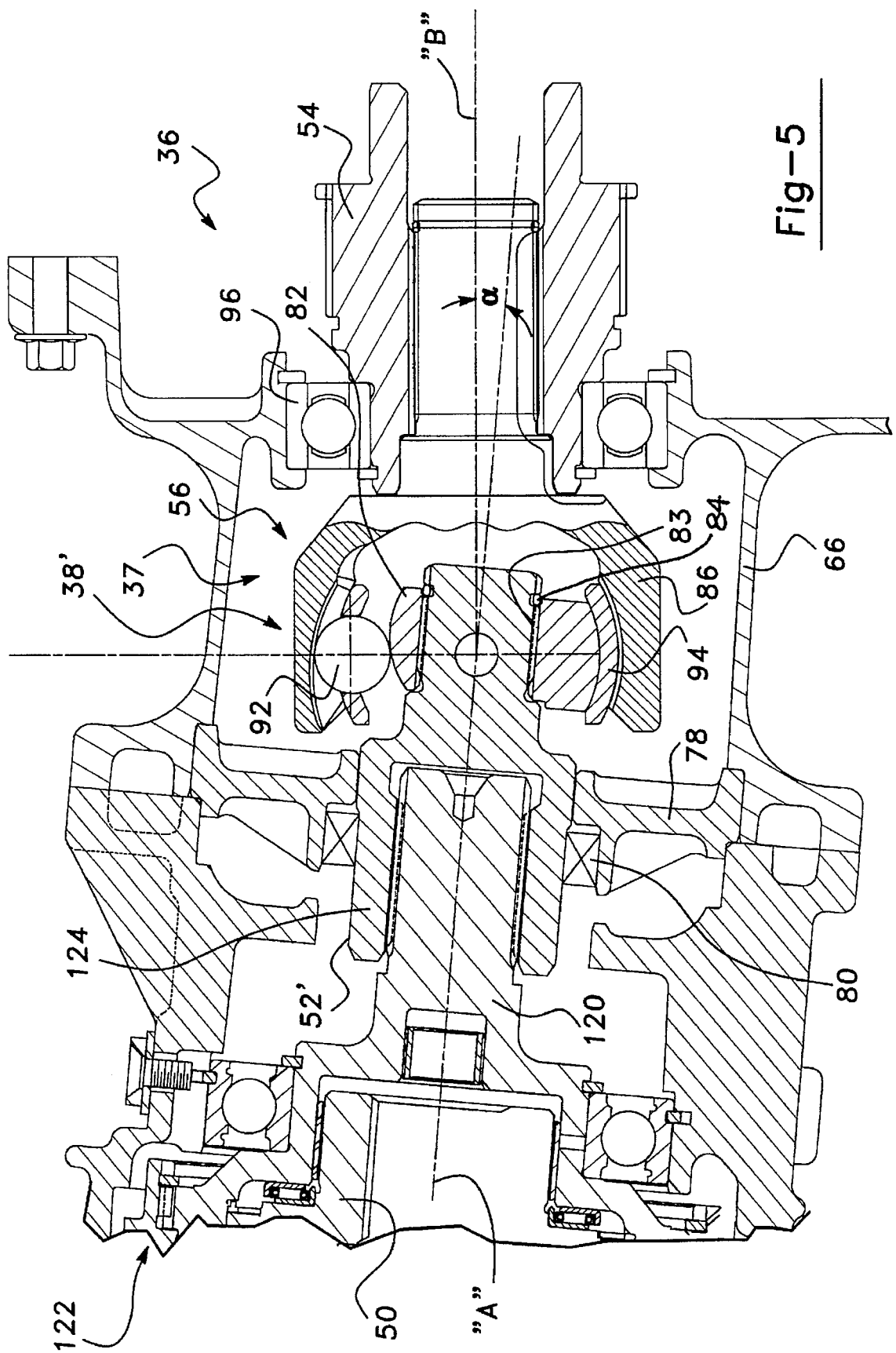
FIG. 5 is a partial sectional view of an alternative construction for the input section of the drop box.

The particular input components associated with input 38 of drop box 36 will be dictated by the specific output components of transmission 14. For instance, transmission output shaft 50 may be coupled directly to inner race 82 of CV joint 56. A specific alternative embodiment is shown in FIG. 5 wherein an externally-splined output shaft 120 for an add-on overdrive unit 122 is coupled to an internally-splined drum portion 124 of input shaft 52'. Add-on overdrive unit 122 is operable for providing an additional forward speed ratio for an existing automatic transmission. Reference can be made to commonly-owned U.S. Pat. No. 4,798,103 to Eastman et al. for details of such a device.

The foregoing discussion discloses and describes preferred embodiments of the present invention as contemplated by the inventors to set forth the best mode of carrying out the inventive concepts. One skilled in the art will readily recognize from such discussions, and from the accompanying drawings and claims, that various changes, modifications and variations can be made therein without departing from the true spirit and scope of the invention as defined by the following claims.

What is claimed is:

1. In a vehicle having a drivetrain and a primary driveline, a drop box comprised of:

a housing;

a first member adapted for driven connection to the drivetrain and supported within said housing for rotation about a first axis;

a second member supported within said housing for rotation about a second axis that is angled relative to said first axis;

a constant velocity universal joint supported within said housing and connecting said first and second members;

a third member adapted for connection to the primary driveline, said third member supported in said housing for rotation about a third axis that is offset and substantially parallel to said second axis; and drive means for drivingly connecting said third member to said second member.

* * * * *